United States Patent
Straayer

Patent Number: 5,850,307
Date of Patent: Dec. 15, 1998

[54] SCANNER SYSTEM HAVING A DUAL TRACE SPINNER

[75] Inventor: Ronald J. Straayer, South Windsor, Conn.

[73] Assignee: Gerber Systems Corporation, South Windsor, Conn.

[21] Appl. No.: 618,394

[22] Filed: Mar. 19, 1996

Related U.S. Application Data

[63] Continuation-in-part of Ser. No. 601,422, Feb. 14, 1996, abandoned, and Ser. No. 311,573, Sep. 23, 1994, abandoned.

[51] Int. Cl.⁶ .................................................. G02B 26/08
[52] U.S. Cl. ........................... 359/209; 359/196; 359/212; 359/226; 359/495
[58] Field of Search ..................... 359/196, 197, 359/209, 212, 220, 223, 226, 485, 487, 494, 495, 497

[56] References Cited

U.S. PATENT DOCUMENTS

| | | | |
|---|---|---|---|
| 4,445,126 | 4/1984 | Tsukada | 346/108 |
| 4,492,436 | 1/1985 | Bergmann | 359/487 |
| 4,506,275 | 3/1985 | Maeda | 346/108 |
| 4,517,608 | 5/1985 | Maeda et al. | 358/298 |
| 4,565,426 | 1/1986 | Cullen | 359/495 |
| 4,578,689 | 3/1986 | Spencer et al. | 346/160 |
| 4,684,228 | 8/1987 | Holthusen | 354/4 |
| 4,712,896 | 12/1987 | Holthusen | 354/5 |
| 4,733,252 | 3/1988 | Daniele et al. | 346/108 |
| 4,920,364 | 4/1990 | Andrews et al. | 346/160 |
| 5,066,962 | 11/1991 | Sarraf | 346/76 L |
| 5,114,226 | 5/1992 | Goodwin et al. | 356/5 |
| 5,187,606 | 2/1993 | Kondo et al. | 359/196 |
| 5,193,008 | 3/1993 | Frazier et al. | 358/298 |
| 5,223,956 | 6/1993 | Kramer et al. | 359/17 |
| 5,251,057 | 10/1993 | Guerin et al. | 359/249 |
| 5,291,392 | 3/1994 | Gerber et al. | 364/167.01 |
| 5,305,135 | 4/1994 | Chovan | 359/202 |
| 5,309,274 | 5/1994 | Akanabe | 359/209 |
| 5,420,714 | 5/1995 | Zelenka | 359/211 |
| 5,481,384 | 1/1996 | Kramer et al. | 359/17 |
| 5,504,619 | 4/1996 | Okazaki | 359/495 |
| 5,636,049 | 6/1997 | Kawata et al. | 359/211 |

FOREIGN PATENT DOCUMENTS

| | | |
|---|---|---|
| 4128468 | 3/1993 | Germany . |
| 2226111 | 9/1990 | Japan . |

*Primary Examiner*—Cassandra C. Spyrou
*Assistant Examiner*—Darren E. Schuberg
*Attorney, Agent, or Firm*—McCormick, Paulding & Huber

[57] ABSTRACT

The present invention encompasses a scanning optical system such as internal drum photoplotters that has a raster scanner for advancing a circularly polarized optical beam across a substrate surface in a first direction to form a scan line and for advancing the optical beam in a second direction substantially perpendicular to the first direction. There is a curved platen for receiving a substrate and an apparatus for switching the optical beam polarization between first and second directions in response to polarization control signals;. An encoder generates signals indicative of the position of the optical beam along a current scan line. There is a controller that receives the encoder signals and generates the advancement signals and the modulator control signals. The controller further provides the optical beam polarization switching signals in dependence on the encoder signals such that the optical beam polarization is switched after the completion of the current scan line. The system is characterized by a spinner which uses polarization switching to generate two scan lines per spinner rotation.

8 Claims, 10 Drawing Sheets

SCANNER SYSTEM HAVING A DUAL TRACE SPINNER

This is a continuation-in-part of application Ser. No. 08/601,422, filed on Feb. 14, 1996, now abandoned, and Ser. No. 08/311,573 filed on Sep. 23, 1994, now abandoned.

TECHNICAL FIELD

The present invention relates to scanners and imagers in general and, more particularly, to scanners in having a dual scan spinner for an enhanced operational efficiency.

CROSS REFERENCE TO RELATED APPLICATIONS

Some of the subject matter herein is disclosed and claimed in the following U.S. patents, all of which are incorporated herein by reference.

U.S. Pat. No. 5,291,392 entitled "Method And Apparatus For Enhancing The Accuracy Of Scanner Systems";

U.S. Pat. No. 3,555,254, entitled "Error Correcting System And Method For Use With Plotters, Machine Tools And The Like";

U.S. Pat. No. 4,851,656 entitled "Method And Apparatus For Enhancing Optical Photoplotter Accuracy".

BACKGROUND OF THE INVENTION

Raster scan photoplotters or imagers having both planar and internal drum design are known in the art. These devices are used in the fabrication of printed circuit boards. Conversely, scanners which read data from a substrate have similar geometries. Planar photoplotters such as disclosed and claimed in U.S. Pat. No. 4,851,656 have a planar surface for receiving a substrate. An optical exposure head is located on a movable gantry apparatus and is rastered above the substrate during exposure. Internal drum photoplotters are characterized by a substantially cylindrical surface portion which receives the substrate. The exposure beam emanates from an optical exposure head and is scanned across the substrate by a rotating spinner. The optical exposure head is indexed along the longitudinal axis of the cylinder to complete the substrate exposure. Internal drum raster photoplotters of the type disclosed in U.S. Pat. No. 5,291,392 have inherent advantages over planar type scanners, including simplicity of design and lower costs.

An exemplary internal drum laser raster imager, the Crescent 42 manufactured by Gerber Scientific, Inc. of South Windsor, Conn., has an internal drum that utilizes a 180° curved surface to receive the substrate. It also has a spinner centered on a longitudinal drum axis. With this configuration, one rotation of the spinner with its nominal 45° scan mirror produces one scan line; yielding a duty cycle of about 50%. As the raster image processing or "RIPing" technology of transferring data and thereafter interpreting it progresses, so does the desire to image faster. However, there are difficulties in advancing the imaging speed of internal drum imagers. The spinner itself is limited to a speed in the range of 20,000 to 24,000 RPM by the air bearing/motor technology and mirror deformation considerations. Another avenue of inquiry involves the use of multiple beams, However, a multiple beam approach is highly difficult to implement due to the internal drum scanning geometry which produces an undesirable rotation in the image plane of multiple beams so that they no longer lie in a plane with respect to the motion axes. Solving this problem requires the addition of a costly and complicated rotating prism assembly which must be synchronized to the spinner.

A further, related issue is the desire to increase the temporal efficiency of the scanner or imager. As noted, prior art systems are limited to a maximum 50% duty cycle. Internal drum imagers can be manufactured with higher angular utilization (i.e. 270°) with higher duty cycle but they add complexity for material handling. A limited duty cycle is undesirable from two respects. First, the lower the duty cycle, the faster the video electronics must be for an equivalent scan rate. Secondly, for systems such as computer-to-plate and direct imaging of printed circuit boards, there can be an exposure limitation. A higher duty cycle improves the system's ability to expose the substrate media.

Earlier efforts to improve the overall throughput of imaging or scanner systems include the device disclosed in U.S. Pat. No. 5,187,606 to Kondo et al. The '606 device shows a scanning optical apparatus that has a light source for emitting a light beam and a deflector, such as a rotating polygonal mirror, with a plurality of mirror surfaces for deflecting the light beam. Each mirror surface of the polygonal mirror has a pair of reflecting surfaces inclined toward the center axis of rotation of the polygonal mirror and orthogonal to each other. There is a fixed reflecting mirror arranged in an opposed relationship with one of the pair of reflecting surfaces so that the light beam deflected by the reflector is reflected, to be returned to the deflector again. The '606 system is used to increase the scanning angle of the laser beam to twice the width as compared to that of conventional polygonal mirrors, thereby increasing the speed of scan without increasing the rotational speed of the polygonal mirror. U.S. Pat. 4,445,126 to Tsukada discloses an image forming apparatus in which recording medium is scanned with a plurality of light beams. The '126 apparatus includes a beam generator for generating a plurality of light beams and presenting them simultaneously to a facet of rotating polygonal mirror. The purpose of the '126 apparatus is to generate a plurality of scan lines at a given time during operation.

An image recording device which relies on multiple beams is disclosed in U.S. Pat. Nos. 4,506,275 and 4,517,608 to Maeda et al. The Maeda et al device includes a recording unit for duplicating and recording halftone images on photosensitive material. The recording unit comprises an acousto-optic light modulating element including a plurality of ultrasonic wave exciting portions disposed side by side on a single acousto-optic medium. The ultrasonic wave exciting portions independently modulate an incident light beam into a plurality of modulated light beams in response to image signals from a photoelectrical scanning means. There is a scaled down optical system which then reduces the diameter of the plurality of modulated light beams at a plurality of light transfer elements to transfer the light beams from the scaled down optical system to a focusing lens to be projected onto a film in a recording cylinder. The system as set forth in the Maeda et al patents relies on a fixed scanning head. The substrate is located on external surface of the rotating drum.

A multiple beam optical modulation system is disclosed in U.S. Pat. No. 5,251,057. The '057 system is used in a raster output scanner that employs one original beam and a facet of a rotating polygon to generate to consecutive scan lines. The original beam is first separated into two beams in a beam splitter. The resultant beams are polarized ninety degrees apart, and directed to a modulator. The beams are a sufficient distant apart so that the acousto-optic (a/o) modulator can modulate each beam with a minimum of crosstalk. The output beams are put brought together to within one scan line separation by a beam recombination device, which is a reversed beam splitter. The beams can be brought together to close proximity without optical interference because the beams are polarized ninety degrees apart.

None of the systems disclosed by the prior art offer a doubling of scan system efficiency nor is there found a system which achieves any improvement in throughput without extensive and cumbersome modifications to system optics and electronics. It would be advantageous to have a system for use with internal drum type scanners or photoplotters which provides two scans for each rotation of the system spinner. The present invention is drawn toward such a system.

SUMMARY OF INVENTION

An object of the present invention is to provide an optical spinner for use with a photoplotter or scanner that provides two scan lines for each rotation.

Another object of the invention is to provide a spinner of the forgoing type that allows for approximately one hundred per cent duty cycle operation.

Still another object of the present invention is to provide a system of the foregoing type in which the system throughput approximately doubles for a given spinner rotation speed.

According to one aspect of the present invention, a scanning optical system includes an optical source for generating a circularly polarized optical beam. There is a curved platen to receive a substrate and a modulator for providing optical modulation to the circularly polarized optical beam in response to received modulator control signals. A raster scanner is responsive to advancement control signals and advances, relative to the substrate, the circularly polarized optical beam across the substrate in a first direction forming a scan line. The raster scanner also advances the circularly polarized optical beam relative to the substrate in a second direction substantially perpendicular to the first direction displacing one scan line from another. There is also an apparatus for switching the optical beam polarization between first and second directions in response to polarization control signals. An encoder generates signals indicative of the position of the circularly polarized optical beam along a current scan line. A controller receives the encoder signals and generates the advancement signals and the modulator control signals. The controller further provides the optical beam polarization switching signals in dependence on the encoder signals such that the optical beam circular polarization is switched after the completion of the current scan line. The scanning optical system also includes a spinner that receives the optical beam from the polarization switching apparatus. The spinner has an quarter wave plate that receives the circularly polarized optical beam and provides a linearly polarized scan beam. A polarization sensitive beamsplitter reflects the linearly polarized scan beam at an internal beamsplitter surface if the linearly polarized scan beam is polarized in a first linear direction. A quarter wave plate receives the linearly polarized scan beam from the polarization sensitive beamsplitter if the linearly polarized scan beam is polarized in a second linear direction orthogonal to the first linear direction. The quarter wave plate rotates the second direction polarized scan beam by ninety degrees as it transits the same. There is a retroreflector for returning the ninety degree rotated second direction polarized scan beam through the quarter wave plate to the polarization sensitive beamsplitter.

According to another aspect of the present invention, a spinner for use in a scanning optical system that has an apparatus for generating a circularly polarized optical beam, an apparatus for switching the optical beam polarization between first and second directions, a curved platen for receiving a substrate and a raster scanner responsive to control signals for advancing, relative to the substrate, the circularly polarized optical beam across the substrate in a first direction forming a scan line and an encoder for generating signals indicative of the position of the circularly polarized optical beam along the current scan line. The spinner includes an quarter wave plate for receiving the circularly polarized optical beam and provides therefrom a linearly polarized scan beam. There is a polarization sensitive beamsplitter reflecting the linearly polarized scan beam at an internal beamsplitter surface if the linearly polarized scan beam is polarized in a first linear direction. A quarter wave plate receives the linearly polarized scan beam from the polarization sensitive beamsplitter if the linearly polarized scan beam is polarized in a second linear direction orthogonal to the first linear direction. The quarter wave plate rotates the second direction polarized scan beam by ninety degrees. A retroreflector receives and returns the ninety degree rotated second direction polarized scan beam through the quarter wave plate to the polarization sensitive beamsplitter.

DESCRIPTION OF THE PREFERRED EMBODIMENT

Figure 1:
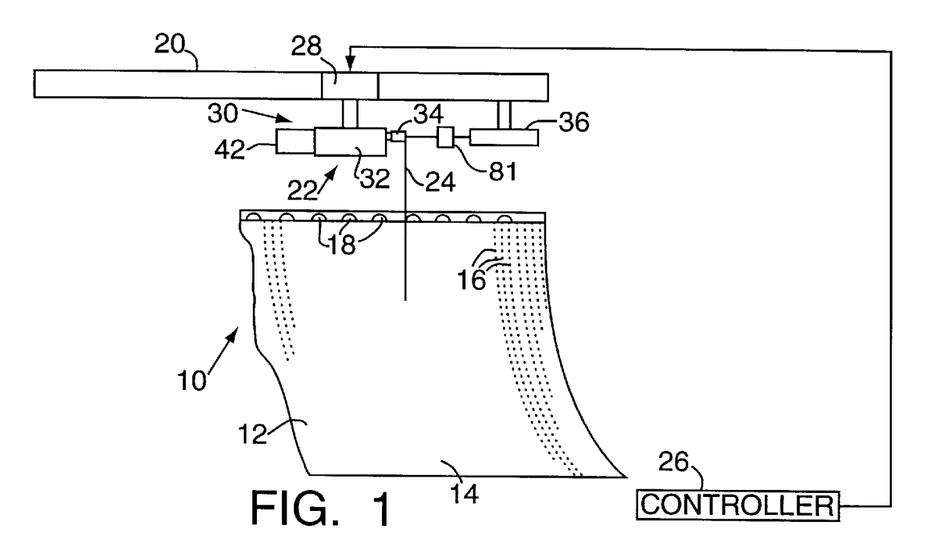
FIG. 1 is a simplified schematic illustration of a portion of an internal drum raster imager system including a spinner provided in accordance with the present invention.
Figure 2:
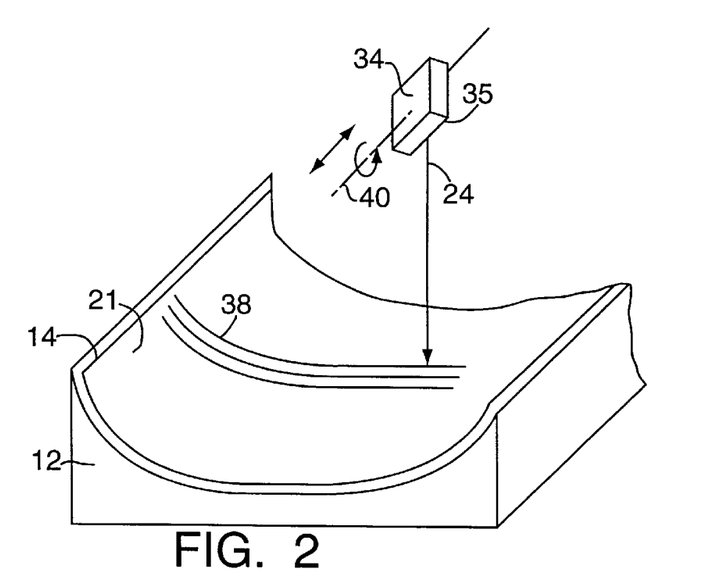
FIG. 2 is a diagrammatic illustration of a portion of the system of FIG. 1 showing a relationship between the scanned beam and the spinner.

Referring now to both FIGS. 1 and 2, there is shown in simplified schematic form a portion of an internal drum raster photoplotter 10 having an internal drum 12 with a surface 14 that comprises a portion of a cylinder. The internal drum is carefully fabricated and must maintain the cylindricity of the drum surface with great accuracy regardless of variations in environmental parameters such as temperature. To that end the internal drum is a substantial structure preferably of cast aluminum with a series of reinforcing ribs (not shown) spaced along an outside perimeter.

The drum surface is adapted to receive a substrate and includes a plurality of holes 16 which communicate with a plurality of internal channels 18 through which a vacuum is generated by conventional apparatus not shown in the drawing. The vacuum is used to hold a substrate 21 in place during the exposure process. Alternative methods can be equivalently used to hold the substrate in place, including electrostatic and mechanical retention techniques.

The photoplotter also includes a rail 20 that has a carriage mounted raster scanner 22 for scanning an optical beam 24 about the substrate surface in response to command signals received from controller 26 in a manner detailed hereinafter. The raster scanner includes a linear encoder 28 for generating signals indicative of the position of the raster scanner as it moves along the rail. Also included is a fast scan apparatus 30, preferably comprised of a motor 32 and a spinner 34, for receiving the optical beam at a mirror surface 35 from an optical beam source, such as laser 36, and for exposing a series of scan lines 38 on the substrate by rotating the spinner about a spin axis 40, typically at 12,000 rpm. A rotary encoder 42 is included for generating signals indicative of the angular position of the mirror surface during a scan. The optical beam is provided along the spin axis to be received at a central point on the mirror surface.

Figure 3:
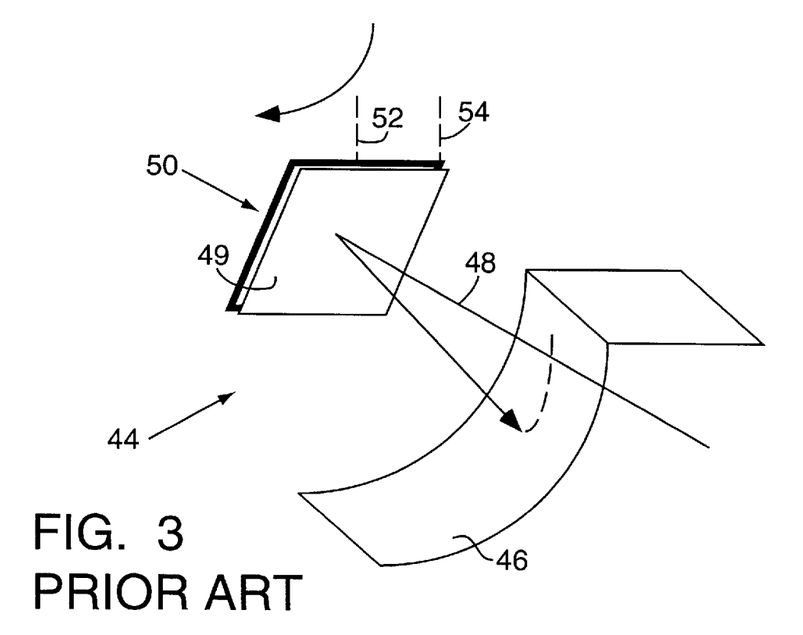
FIG. 3 is a simplified schematic illustration showing an initial portion of a scan of an optical beam across the internal drum surface by a prior art photoplotter.

FIG. 3 is a simplified schematic illustration of a portion of a prior art photoplotter 44. Shown in FIG. 3 is a first portion of a rotary drum substrate surface 46 which receives a beam of light 48 reflected from a mirror surface of spinner 50. The spinner 50 is rotated about a rotational axis 52 and advances the beam from right to left in the figure. The spinner mirror surface is oriented at 45 degrees along the central axis of the internal drum which also corresponds to the optical axis along which the exposure beam traverses before presentation to the substrate surface. The mirror surface is oriented to the optical axis of a laser beam and presents the beam directly to the surface. A full rotation of the spinner will yield a laser beam presented to the entire internal drum surface; both the section containing the substrate and the remainder thereof.

Figure 4:
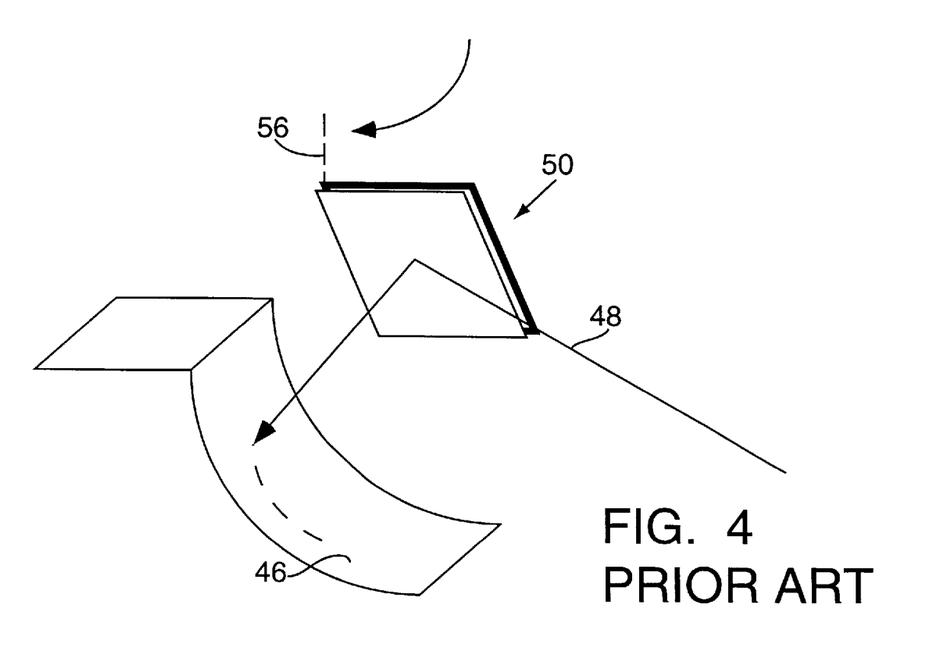
FIG. 4 is a simplified schematic illustration showing a final portion of the scan of FIG. 3.
Figure 5:
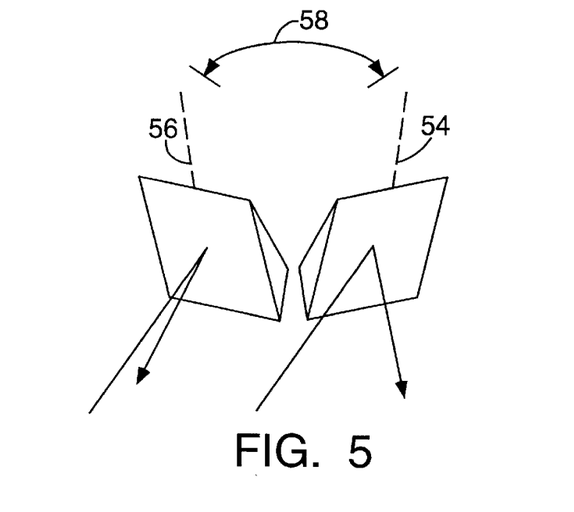
FIG. 5 is a diagrammatic illustration showing the effective duty cycle of the photoplotter of FIG. 2.

There is an initial spinner position 54 before which the beam would otherwise be presented above the internal raster drum substrate surface 46 and therefore not to the substrate. FIG. 4 shows a second spinner position 56 subsequent to the initial position shown in FIG. 3 in which the beam is almost completely advanced across substrate. The rotational extent of these two positions is displayed diagrammaticaly with respect to FIG. 5 by curve 58. Beyond spinner position 56, the spinner must rotate around to its initial position shown in FIG. 3 before the controller can again present the modulated exposure beam for creating a scan line. In many scanners, the internal drum surface which receives the substrate extends only 165 degrees, much less than the practical upper bound of 180 degrees. As a result, the duty cycle of prior art systems is even less than 50%.

Figure 6:
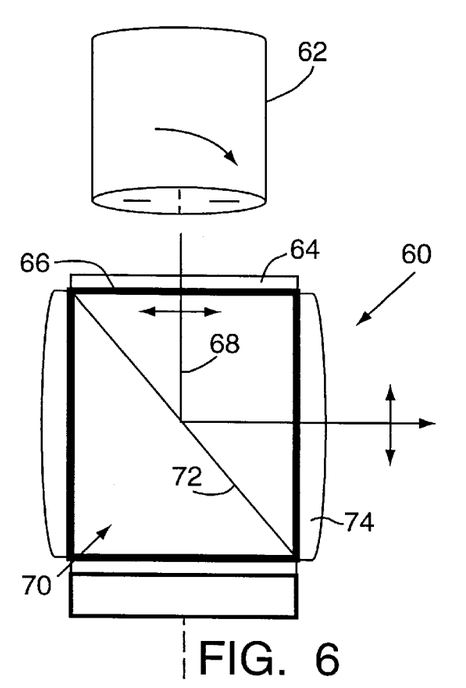
FIG. 6 is a simplified schematic illustration of a spinner provided in accordance with the present invention receiving a counterclockwise, circular polarized light beam.
Figure 7:
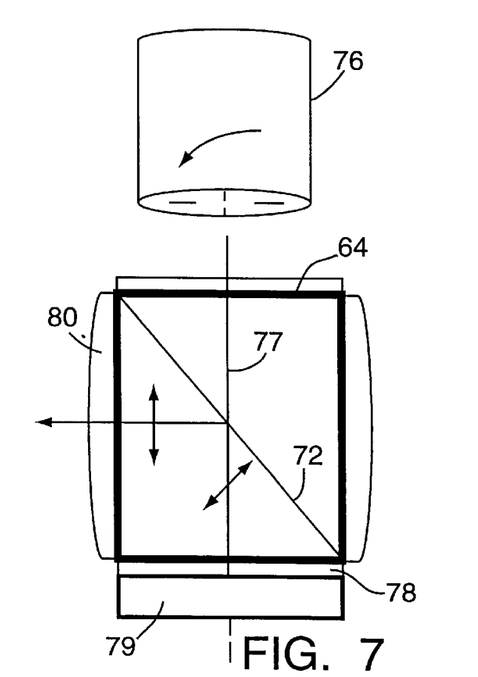
FIG. 7 is a simplified schematic illustration of a spinner provided in accordance with the present invention receiving a clockwise, circular polarized light beam.

FIGS. 6 and 7 are simplified schematic drawings showing a spinner 60 provided according to the present invention. The spinner allows for two scan lines for each rotation. In the present invention, the speed of the spinner is substantially the same as in known systems. Fundamental to the present design is the concept of polarization switching of the incident laser beam. In FIG. 6, a collimated beam of light 62 which feeds this scanner is circularly polarized in a clockwise rotation. A first quarter wave plate 64 positioned on a first spinner surface 66 to receive the beam. A linearly polarized, first scan beam 68 is created through the interaction of the ⅛th wave plate and transits a polarization sensitive beamsplitter (PSBS) 70 with an "S"" orientation. This first scan beam is received and reflected by a internal surface 72 of the PSBS such that the reflected beam exits the spinner to follow the direction of scanner rotation. The internal surface is polarization sensitive such that incident light of select polarizations will be transmitted while other polarizations (e.g., "S" orientation) will be reflected. The PSBS surface reflects nearly 100% of the linearly polarized light. There is also a lens 74 which focuses the first scan beam before presentation to the substrate.

The first scan beam, therefore, is generated in a manner similar to that done in prior art systems and constitutes the initial beam generated by the present system. For the second scan, an input (feed) beam to the scanner is polarization switched by 180° to circular/counterclockwise, as represented by beam 76 in FIG. 7. The first quarter-wave plate now creates a linearly polarized second scan beam 77 in a "P" orientation perpendicular to the S-beam. The light of the second scan beam propagates through the polarization sensitive beam splitter past the internal surface with nearly 100% efficiency. Following the PSBS, the polarization of the light is further rotated by 90 degrees by quarter wave plate 78 and reflected back by retroreflector 79. On return, the retroreflected beam is again polarization rotated by an additional 90 degrees by the quarter wave plate to be polarized in the "S" orientation, as was the first scan beam. The PSBS internal surface reflects the now S polarized second scan beam which transits a focusing lens 80 and presents the same to the substrate.

The present system takes advantage of the above spinner by including an accousto-optical device 81 which receives switching signals from the controller to change the polarization of the input beam between clockwise and counterclockwise polarizations. Since the preferred encoder generates a once per revolution signal, the controller now enables presentation of the modulated beam at two predetermined times during a each revolution of the spinner, as opposed to once per revolution. Similar changes to the other components and system parameters are accomplished as well, including a doubling of the advancement speed in the slow scan direction.

Other examples of an optical return which can be substituted for the flat mirror of FIGS. 6 and 7 include a retroreflector, a roof prism or a roof mirror. Systems built in accordance with the present invention and which incorporate either a simple mirror or a retroreflector are burdened by the need for almost perfect alignment of the optical components which comprise the optic train.

Figure 8:
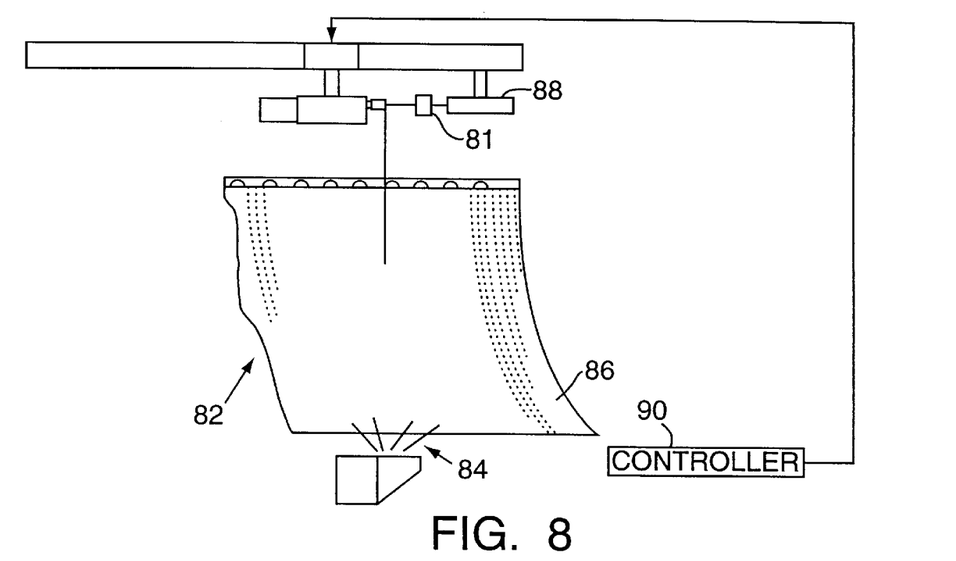
FIG. 8 is simplified schematic illustration of scan lines written by first and second scan beams not compensated for scan error.

Without such ideal alignment, the spinner will present the first and second beams to necessarily different positions on the substrate when they should, in fact, be superimposed (as determined without slow scan indexing). As shown in FIG. 8, there is seen two scan lines written on a substrate. Lines 116, 118 are respectively generated by first and second scan beams by a system with a simple mirror as an optical return and with some error introduced. The lines clearly deviate from the ideal positions of nominal scanlines 120, 122 which would be produced by a perfect system.

The optic train which generates and guides the first and second scan beams in the present system can (and typically does) have some degree of misalignment among the several optical components or inaccuracies in the components themselves. Accordingly, the optic train, and the spinner in particular, must be tolerant of first scan beam deviation from the input optic axis and the subsequently induced deviation from the preferred optical path of the second scan beam, or simple variation of the second scan beam from its preferred path. In certain situations the second scan beam will be provided to the substrate at a location that is different from the substrate position which receives the first scan beam even when a roof prism or mirror is employed as an optic return. As a result, the "written" scan lines will differ in position according to whether written by the first or second scan beams. The tolerance for this misalignment is extremely small; errors less than or equal to 20 microinches are problematic.

Figure 9:
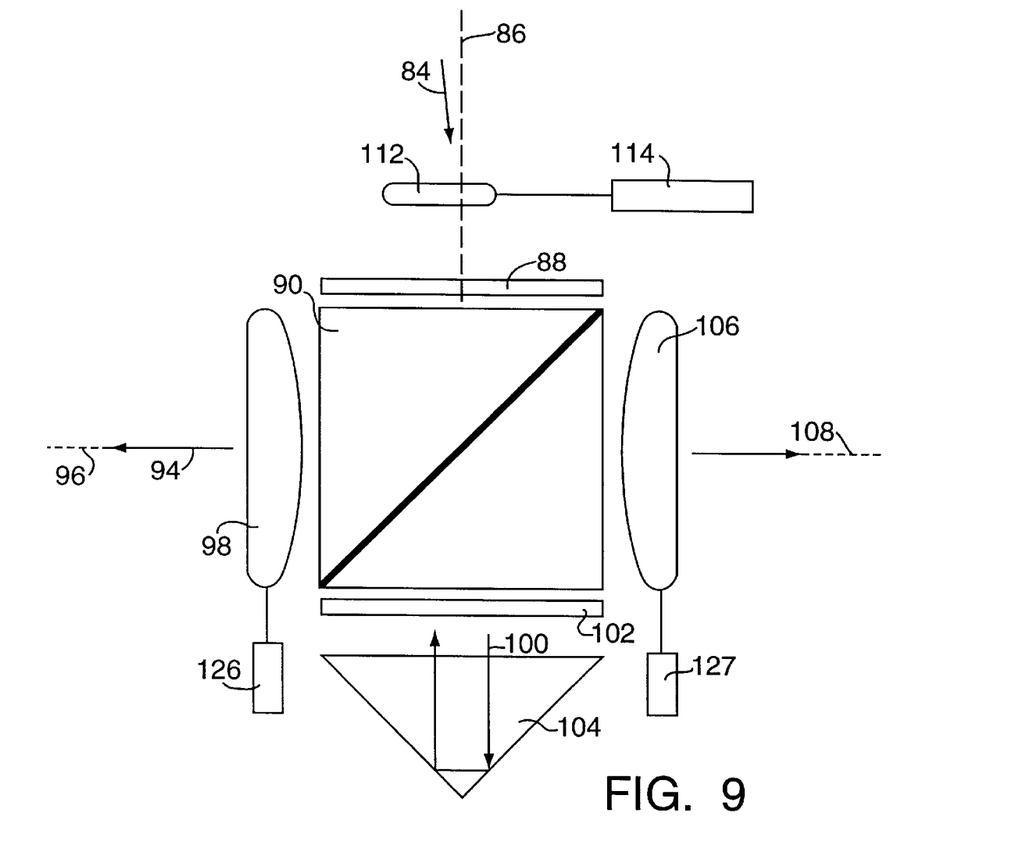
FIG. 9 is a simplified schematic illustration of an alternative embodiment of the present invention having a Roof Prism.

The embodiment of the present invention as set forth with respect to FIG. 9 incorporates a roof prism or roof reflector as an optical return of the second scan beam, and as such, can tolerate a wider range of input angles and displacements and yet still superimpose the first and second scan beams. In FIG. 9 there is schematically shown a simplified illustration of an alternative spinner 82 provided according to the present invention. The alternative spinner is substantially similar to the spinner described above. A circularly polarized beam 84 is presented along input axis 86 to a quarter wave plate 88 and thereafter to a polarization sensitive beam splitter 90. The light either is reflected from internal surface 92 or passes therethrough in dependence on the beam's polarization.

A first scan beam 94 exits the polarization sensitive beam splitter 90 along output axis 96 through lens 98. A second scan beam 100 passes through quarter wave plate 102 and enters an optical return 104 which is a roof prism in the Figure. The light is turned by reflection within the prism or roof reflector and presented again to quarter wave plate 102 which rotates the polarization of the beam, resulting in the second scan beam being reflected by the internal surface 92 and presented to lens 106 along axis 108. Deficiencies in the optic train corresponding to an angular deviation 110 in the input beam from ideal coincidence with input axis 86. As a result, scan lines vary from their respective preferred positions as written on a substrate surface.

In the embodiment of the present invention shown in FIG. 9, there is also included apparatus 126, 127 for allowing lateral adjustment of the lenses 98, 106 relative to the output optic axes 96, 108. The apparatus are of a type known in the art and can be manually adjustable, as either or both of the lens positions can be adjusted during an initial alignment to remove any mispositioning of the scan lines relative to one another as written by the respective first and second beams, and thereby compensate for any errors from the optic train. In the alternative, the spinner may include an optical wedge or wedges 112 operated by control apparatus 114 to remove error from the input beam.

It is further understood that only an adjustment mechanism cause scan line superposition in the slow or cross scan dimension is required. Adjustment during a scan can be provided effectively by means of modification to the pixel clocking electronics.

Spinners which have only simple reflectors (e.g. planar, reflective surfaces) are burdened by the need for dynamic compensation of scan line position errors. These systems must dynamically compensate for errors "on the fly" (as the scan line is written), since the optics of these spinners do not allow for a single correction to be made which is valid for every pixel in the scan line. Accordingly, compensation apparatus must be programmed with the appropriate magnitude of compensation for each pixel position in a scan line written by each of the first and second scan beams.

Figure 13:
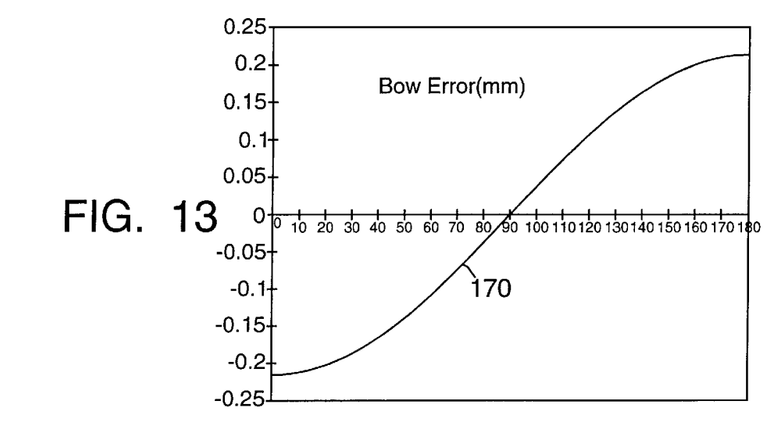
FIG. 13 is a diagrammatic illustration detailing an alignment error introduced in the first scan beam in the system of FIG. 9.
Figure 14:
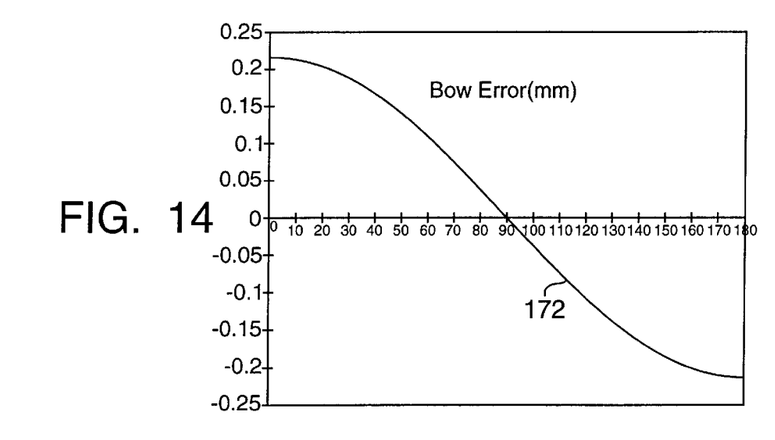
FIG. 14 is a diagrammatic illustration showing effect of the alignment error illustrated in FIG. 13 in the second scan beam in the system of FIG. 9.
Figure 15:
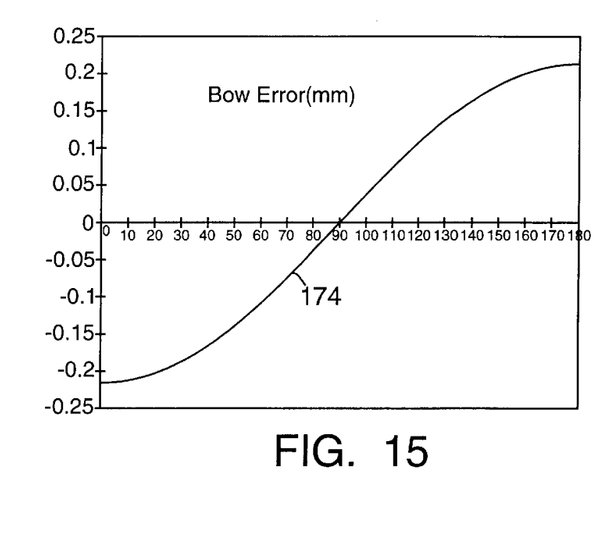
FIG. 15 is a diagrammatic illustration showing effect of the alignment error in the second scan beam of the system of FIG. 9 with a mirror substituted as an optical return.

FIGS. 13–15 graphically show the computed effect of error in the scan lines produced by the first and second scan beams with the embodiment of the present invention shown in FIG. 1 as compared with that of FIG. 9. The error can be the result of input beam misalignment, a mispositioning of one or more optic train elements, defects therein or combinations thereof.

In FIG. 13, error is deliberately introduced into the first or primary scan in a system as provided by the present invention and is manifested as bow error (curve 170). The bow error is a function of spinner rotation angle from 0 to 180 deg. and has a magnitude of plus or minus approximately 0.22 mm. Curve 172 is shown in FIG. 14 and results in a system in which a simple mirror is used as the optic return, while a system which uses a roof mirror or prism yields curve 174 in FIG. 15. A comparison of curves 172 and 174 reveals that only the system with the roof mirror produces in the second scan line the same error, both in magnitude and sign, as was introduced into the first.

Accordingly, a simple adjustment to remove the error from the first scan beam will remove the error from the second scan beam. Apparatus to remove the error is selected in dependence on the application. In a system that employs a cube/beamsplitter and roof mirror, a wedge prism may be inserted about the spin axis corotating with the assembly and rotated to remove the error, as noted above. The compensation apparatus described above is also preferred in Wollaston systems described hereinafter.

Figure 10:
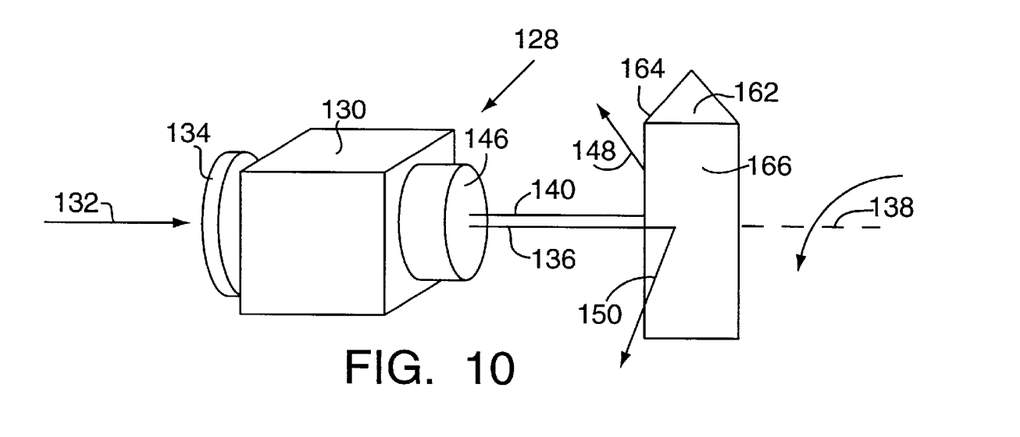
FIG. 10 is a simplified schematic illustration of another alternative embodiment of the present invention having a Wollaston prism.
Figure 11:
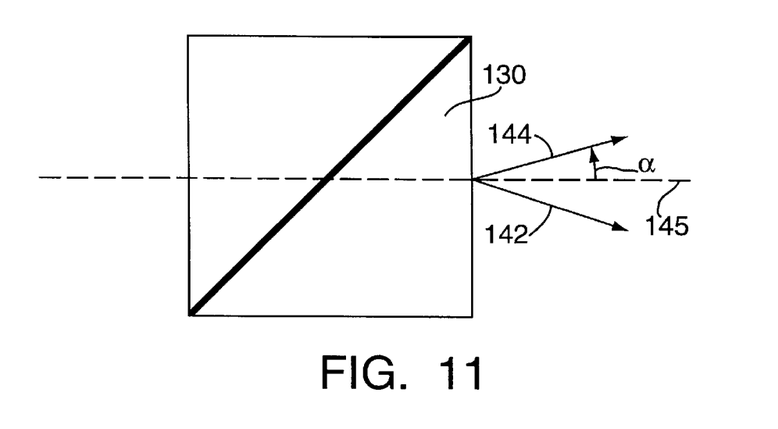
FIG. 11 is a sectioned illustration of the Wollaston prism of FIG. 10.

Referring now to FIG. 10, there is shown a simplified schematic illustration of a alternative embodiment 128 of the present invention characterized by a Wollaston prism 130. The alternative Wollaston system also employs polarization switching and a polarization sensitive optical component. As with other embodiments, an incident beam 132 of light having either a left or right circular polarization is presented through a quarter wave plate 134 producing a beam of one linear polarization, (S) as an example. As the light transits the Wollaston prism, a first scan beam 136 is generated which is displaced from axis 138 by a deviation angle 141. Light in a second scan beam 140 with the complimentary (P) polarization proceeds down a second path with an equal and opposite displacement angle from the optic axis. As seen in the schematic, sectioned illustration of the prism in FIG. 11, the beams 142, 144 of different polarization transiting a Wollaston prism 130 are deflected an equal amount from the optic axis 145.

Figure 12:
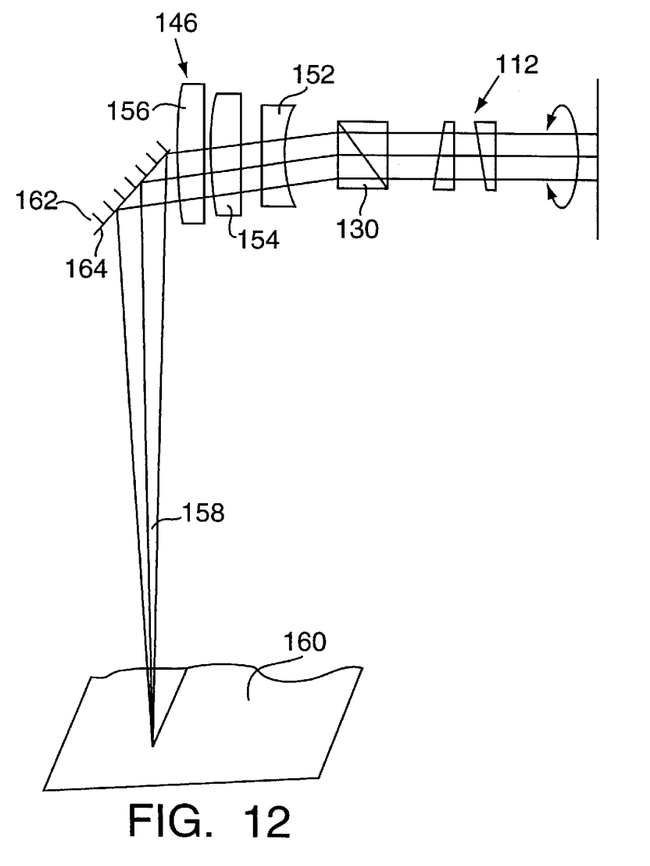
FIG. 12 is a sectioned illustration of the lens in the embodiment shown in FIG. 10.

Following the Wollaston prism, is a lens 146 centered about the axis and common to both polarization paths. The lens focuses the collimated light to two separate foci 148, 150. In the embodiment of FIG. 10, the lens is of moderate complexity because of the off axis performance requirements but is otherwise of conventional design. A sectioned schematic illustration is found in FIG. 12 showing elements 152–156 that comprise the lens providing a scan beam 158 to a substrate 160.

A double mirror 162 is also shown in FIG. 10 that has an "ax blade" geometry and which is positioned to receive the focused scan beams from the lens. Each beam is presented to a respective surface 164, 166 of the mirror to fold out the beam towards the cylindrical imaging surface that holds the substrate. In other embodiments, the lens structure may be deleted, assuming that the "ax mirror" or equivalent optics contains some optical power to bring the beams into focus at the cylinder's surface.

The scanning system provided by this embodiment presents several advances over some of the other embodiments of the present invention described hereinabove. The Wollaston system is inherently symmetrical. In the presence of alignment errors to the scan assembly, the scan lines which are produced are exactly equal. The two complimentary beam paths are collinear and are superimposed on the surface of the drum, assuming that the drum is not moved in the slow scan direction. In other words, the input beam is now parallel to the spin axis. In the event of a misalignment within the rotating scanner, for example ax blade mirrors which are located at slightly different angles relative to the spin axis, compensation is straightforward and is provided by shifting the scan lens laterally in its position with respect to the spin axis or by alignment of a co-rotating wedge prism.

In addition, the Wollaston system of FIG. 10 avoids spinning of the focusing lenses off the input axis, and thereby avoids all of the challenges of mechanical stress and stress induced optical birefringence which would otherwise occur. As a result, the system can be created to spin at higher speeds than would otherwise be possible in a system with optical components located off axis. Moreover, the Wollaston system presents fewer parts than does other embodiments of the present invention, and the tolerance requirements on these parts are generally lower than that of the above described embodiments.

Figure 16:
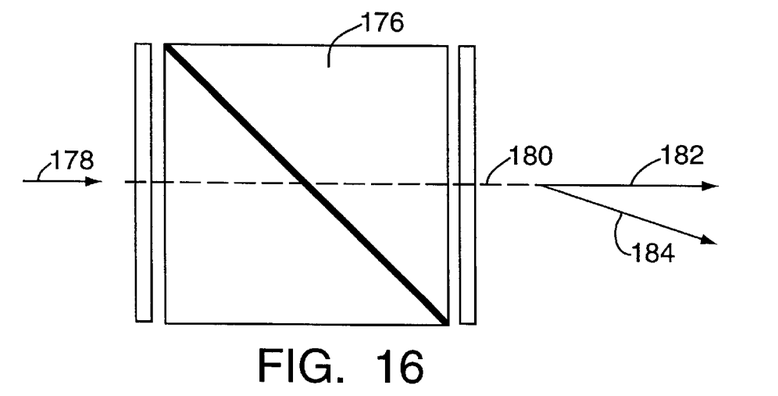
FIG. 16 is a sectioned illustration of a spinner with a Rochon prism used as an alternative to the Wollaston prism of FIG. 10.

Similar systems may be built using a Rochon prism in place of the Wollaston prism as shown in FIG. 16. As is known, a Rochon prism 176 which receives a beam 178 will deflect light of a selected polarization. A scan beam 180 of a first polarization will exit the prism along optic axis 182 directly, with the second scan beam 184 presented at an angle thereto. A Glan or Glan-Thompson prism can also be used to construct a system of the present type without substantial modification to the systems described hereinabove. Those skilled in the art will note that a Glan-Thompson prism is similar to a Nicol prism which produces plain polarized light, but has its internal faces normal to the optic axis.

Figure 17:
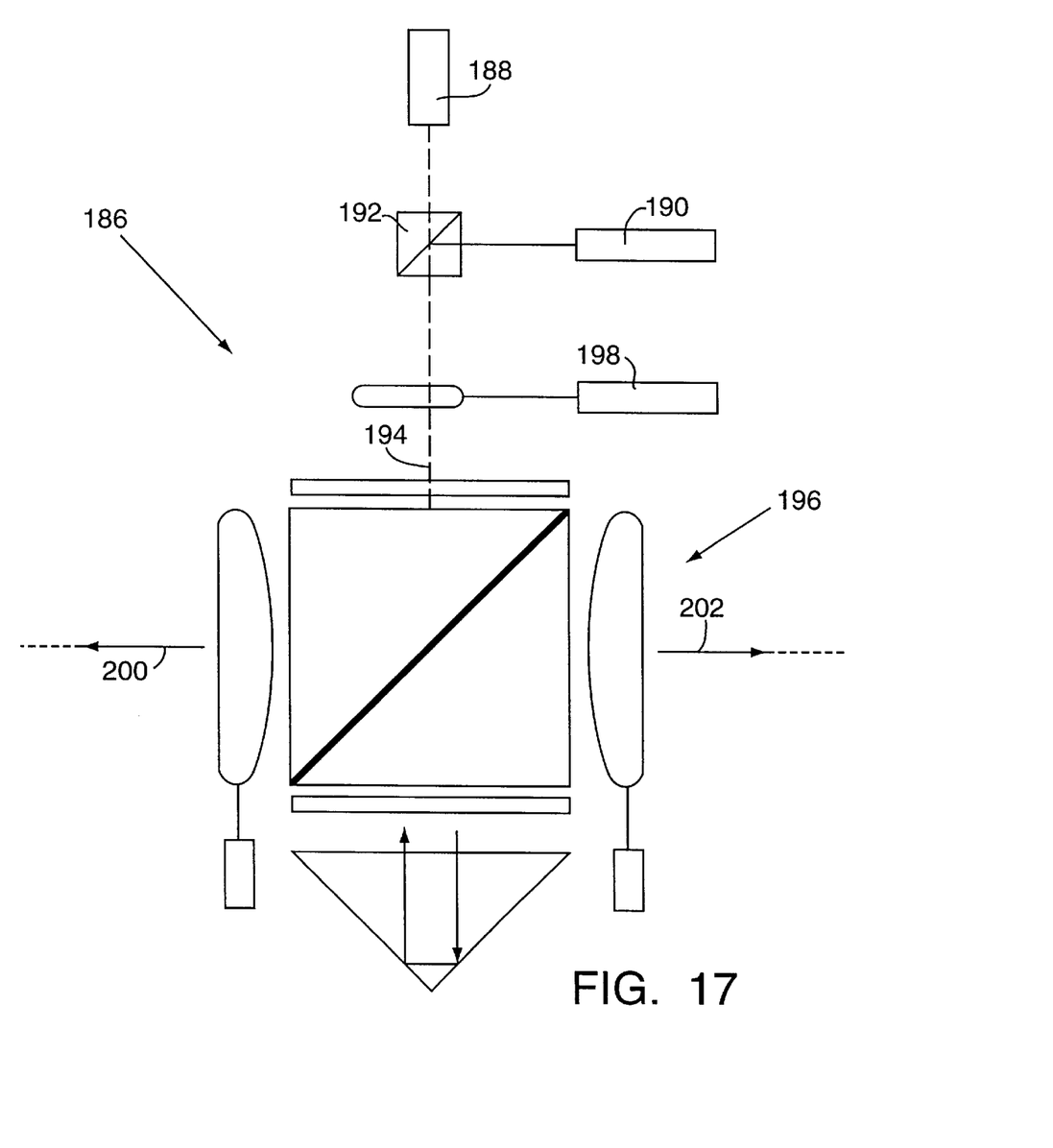
FIG. 17 is a diagrammatical illustration of an alternative embodiment for the present invention characterized by simultaneous presentation of dual scan beams.

Referring now to FIG. 17 there is shown in diagrammatic form an illustration of an alternative embodiment 186 of the present invention characterized by the simultaneous presentation of dual scan beams. In comparison to the embodiments described hereinabove, the dual scan system of FIG. 17 has two light sources 188 and 190 which are both circularly polarized but whose polarization have the opposite sense (e.g., right hand vs. left hand circular polarization). Both beams are combined at beam combiner 192 for presentation along scan axis 194. Both beams are then presented simultaneously to scanner 196 which is substantially as described hereinabove with respect to FIG. 9. An adjustment mechanism to 198 may also be included to perform the same functions as noted above.

With the embodiment of FIG. 17, each beam 200 and 202 maps directly back to its laser modulator and data stream. Consequently, the number of scans per revolutions has doubled. The embodiments described previously generate two scans per revolution whenever the active scanning is less than $\pi$ radians (180°). The embodiment of FIG. 17 no longer has the limit of 180°. However, two modulators as well as two optical sources (lasers) and beam combining optics are required with this embodiment of the present invention.

The Wollaston system set forth above suffers from several drawbacks which can affect system performance. These include an asymmetry in deviation angles of the beams output from the Wollaston prism. An input beam which traverses a path at a slight angle to optic axis will exit a Wollaston prism at an angle whose magnitude is dependent on beam polarization. In practice, typical deviation angles are −9.7° and +10.9°. These may be balanced to a mean separation of 10.3° with the addition of an optical wedge. However, this configuration does not solve other problems which afflict the Wollaston system.

The Wollaston system also possess an asymmetry in the angular magnification. The input beam is received by the prism at a small angle to the optic axis. This small input angle is typically due to a residual alignment error between the optical chassis and the scanner (e.g. 0–5 arc minutes). Beam magnification is different for each polarization. In order for the system as a whole tolerate alignment errors, the Wollaston system needs to be highly symmetrical. For an input angular error of S arc minutes, the Wollaston prism will generate a constant tilt error in the output beams within 0.2 arc seconds, in addition to the input tilt. The standard Wollaston prism has a tilt response of about 1 arc minute to a 5 arc minute input (or 300 times the tilt error). Moreover, the Wollaston prism has an exit pupil, representing the axial tilt position, which is at unequal planes for the two cases.

Figure 18:
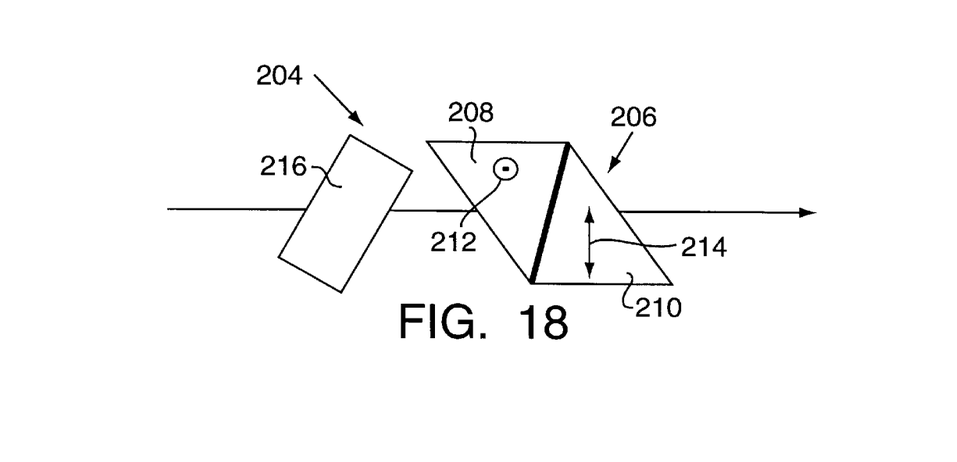
FIG. 18 is simplified diagrammatic image of a modified Wollaston prism assembly used with an alternative embodiment of the present invention.

All of these problems are effectively addressed in a modified Wollaston prism system 204 of FIG. 18, also referred to as a Straayer prism assembly. The system 204 is substantially the same as shown with respect to FIG. 10, but includes a prism assembly 206 comprised of first and second prisms 208, 210 substantially identical, but with crystal axes 212, 214 oriented orthogonal to one another. The crystallographic axis of the first prism extends out from the page, while that of the second prism is lengthwise in the Figure. The prisms each have base angles of 67 deg, 20' plus/or minus 10', with an apex angle of 48 deg, 50' plus/minus 10'. In the embodiment of FIG. 18, the prisms are cemented together so the assembly has a base of 12 mm plus/minus 0.2 mm and a height of 13.2 mm. The specifications set forth above are exemplary of a selected aperture and wavelength (488 mm).

There is also a glass (SF57) window 216 having a known anti-reflection coating. The window is 6 mm plus/minus 0.25 mm in thickness and 20 mm plus/minus 0.25 mm in diameter and is placed in the system to receive an input optical beam prior to presentation of the same to the prism assembly. The index, thickness, and tilt angle of this window are chosen to force the beam deviations to occur from a common exit pupil plane.

The design of this modified Wollaston system has several distinguishing characteristics. The beam has an angle of incidence on first prism surface which is equal to the mean angle of exit or average angle between the two deviation beams. The angle of incidence in the system shown in FIG. 18 is approximately 22.5°. The prism angle of the deviation prisms being nearly equal (approximately 48°). The addition of a plane parallel deviation window brings the exit pupils of the two beam deviation cases into coincidence.

Figure 19:
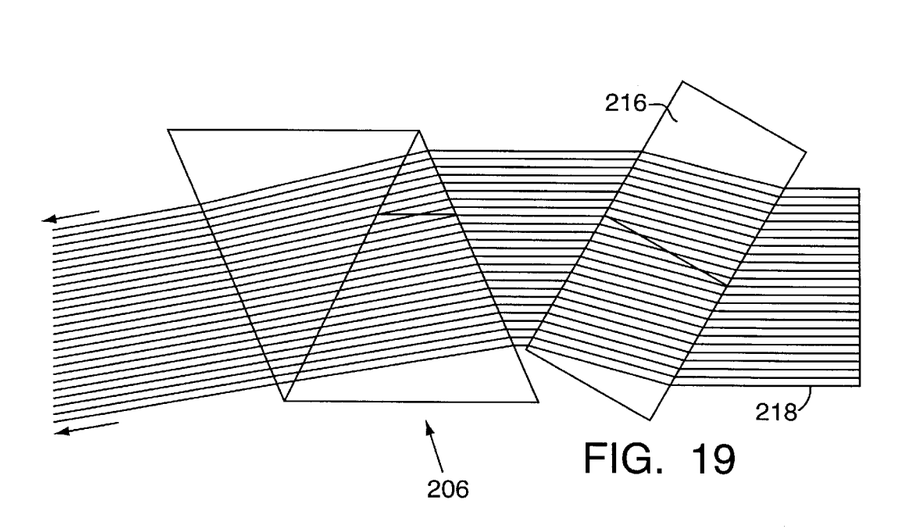
FIG. 19 is a simplified schematic illustration of a portion of the modified Wollaston system of FIG. 18 showing the path of a beam of first polarization.
Figure 20:
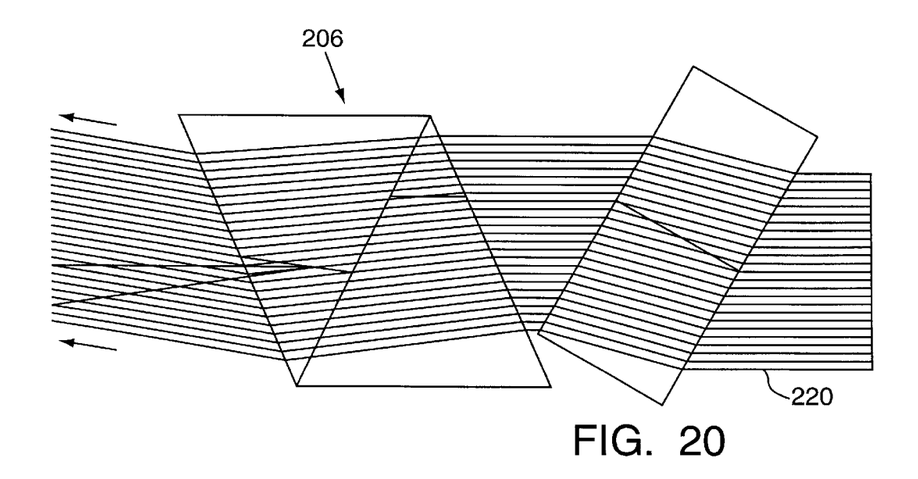
FIG. 20 is a simplified schematic illustration of the modified Wollaston system of FIG. 18 showing the path of a beam of second polarization.

FIGS. 19 and 20 illustrate the performance of the modified Wollaston system of FIG. 18 when receiving first and second beams 218 and 220, respectively, of different polarization. In FIGS. 19 and 20, as in FIG. 12 the beams traverse from right to left in contrast to the several other Figures.

In FIG. 19, input beam 218 is presented first through window 216 before transiting prism assembly 206. The beam is then deflected downward in the Figure to be received by a first surface of the double mirror as in the system of FIG. 12. The double mirror is not shown in FIGS. 19 or 20, but is substantially as indicated with respect to the Wollaston prism embodiment of FIG. 10. In FIG. 20, the second beam 220 which has the opposite circular polarization as compared with beam 218 is presented through the same window 216 and prism assembly but now is deflected upwards in the Figure for presentation to a second surface of the double mirror.

Similarly, although the invention has been shown and described with respect to a preferred embodiment thereof, it would be understood by those skilled in the art that other various changes omissions and additions thereto may be made without departing from the spirit and scope of the present invention.

I claim:

1. A scanning optical system receiving a substantially circularly polarized optical beam, said system comprising:

a modulator means for providing modulation to said circularly polarized optical beam in response to received modulator control signals;

a curved platen for receiving a substrate;

a raster scanning means responsive to advancement control signals for advancing, relative to said substrate, an optical beam across a substrate surface in a first direction forming a scan line and for cooperatively advancing, relative to said substrate surface, said circularly polarized optical beam in a second direction substantially perpendicular to said first direction;

a means for generating first and second optical scan beams respectively polarized in first and second polarization directions in response to polarization control signals;

an encoder means for generating encoder signals indicative of the angular position of a spinner about a scan axis and consequently indicative of the optical beam along a current scan line;

a controller, receiving said encoder signals, for generating said advancement control signals and said modulator control signals, said controller further providing said optical beam polarization switching signals in dependence on said encoder signals such that said optical beam polarization is switched between said first and second polarization direction after the completion of the current scan line;

said spinner receiving said first and second optical scan beams and including a first quarter wave plate, receiving said optical beam, for providing linearly polarized first and second scan beams;

a polarization sensitive beamsplitter for presenting each of said first and second linearly polarized scan beams respectively along a one of two scan beam output axes displaced from each other and selected in dependence upon said scan beam polarization;

a focusing means for receiving and focusing said beamsplitter output beams along substantially parallel axes onto said substrate surface; and an optical deflection means for presenting said first and second linearly polarized scan beams in opposed directions, thereby generating two scan beams per beam splitter revolution about said scan axis.

2. The scanning optical system of claim 1 wherein said optical deflection means further comprises an ax-blade mirror.

3. The scanning optical system of claim 1 wherein said polarization sensitive beamsplitter further comprises a Wollaston prism.

4. The scanning system of claim 3 further combining a second quarter wave plate positioned to receive said first and second scan beam subsequent to said Wollaston Prism, thereby ensuring said scan beams presented to said substrate are circularly polarized.

5. The optical system of claim 3 wherein said Wollaston prism comprises a prism assembly of first and second prisms each having respective crystallographic axes, oriented orthogonal to one another; and a glass window receiving said optical beam prior to presentation to said Wollaston prism, said window positioned at a selected angle of tilt to said input beam optic axes, thereby bringing exit pupils of said first and second optical scan beams into coincidence.

6. The optical system of claim 5 wherein said first and second prisms are cemented together and each prism having a base angle of approximately 67 degrees, 20 minutes with an apex angle of approximately 48 degrees, 50 minutes, said window tilt angle approximately equal to 30 degrees.

7. The optical system of claim 6 wherein said first and second prisms each have base angles of approximately 67 deg, 20' plus/or minus 10', with an apex angle of 48 deg, 50' plus/minus 10'.

8. The scanning optical system of claim 1 wherein said polarization sensitive beamsplitter further comprises a Rochon prism.

* * * * *